(12) United States Patent
Tseng (10) Patent No.: US 12,481,105 B2
(45) Date of Patent: Nov. 25, 2025

(54) OPTICAL CONNECTOR

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

(*) Notice: Subject to any disclaimer, the term of this patent is extended or adjusted under 35 U.S.C. 154(b) by 304 days.

(21) Appl. No.: 18/244,256

(22) Filed: Sep. 10, 2023

(65) Prior Publication Data

US 2024/0085640 A1 Mar. 14, 2024

(30) Foreign Application Priority Data

Sep. 13, 2022 (TW) ................................. 111134599

(51) Int. Cl.
*G02B 6/38* (2006.01)
(52) U.S. Cl.
CPC ......... *G02B 6/3881* (2013.01); *G02B 6/3831* (2013.01)
(58) Field of Classification Search
None
See application file for complete search history.

(56) References Cited

U.S. PATENT DOCUMENTS

| | | | |
|---|---|---|---|
| 11,099,332 B1* | 8/2021 | Kuprin ................. | G02B 6/3887 |
| 11,314,023 B2* | 4/2022 | Tseng ................... | G02B 6/3825 |
| 11,353,664 B1* | 6/2022 | Wong ................... | G02B 6/3821 |
| 11,585,989 B2* | 2/2023 | Takano ................ | G02B 6/38875 |
| 11,747,575 B2* | 9/2023 | Giglio .................. | G02B 6/3869 385/78 |
| 2021/0263238 A1* | 8/2021 | Tseng ................... | G02B 6/3869 |

* cited by examiner

*Primary Examiner* — Jerry Rahll (57) ABSTRACT

The present invention provides an optical connector, comprising: a structural body, having a first top surface, a first bottom surface, a first lateral surface, and a second lateral surface, wherein the first lateral surface and the second lateral surface are connected to the first top surface and the first bottom surface, the first lateral surface has a first opening slot, and the second lateral surface has a first buckle structure; and a terminal portion, coupled with a communication wire, having a second top surface, a second bottom surface, a third lateral surface, and a fourth lateral surface, wherein the third lateral surface and the fourth lateral surface are connected to the second top surface and the second bottom surface, the fourth lateral surface has a second buckle structure, the terminal portion is movably connected to the structural body.

9 Claims, 7 Drawing Sheets

OPTICAL CONNECTOR

CROSS-REFERENCE TO RELATED APPLICATION

This application claims the benefit of Taiwan Patent Application No. 111134599, filed on Sep. 13, 2022, in the Taiwan Intellectual Property Office of the ROC, the disclosure of which is incorporated herein in its entirety by reference.

FIELD OF INVENTION

The present invention relates to an optical connector. In particular, it relates to an optical connector capable of transmitting optical signals and electrical signals.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In order to achieve the goal, the optical connector with optical fiber transmission medium has become the main force for the data center to increase the amount of data and the growth of the transmission rate. However, in some usage scenarios, such as transmission towers or relay stations, in addition to using optical fibers to transmit information, wires for transmitting power are also required to supply power to receivers and transmitters. Based on this demand, there are optical connector products on the market that can transmit optical signals and power at the same time.

Figure 1:
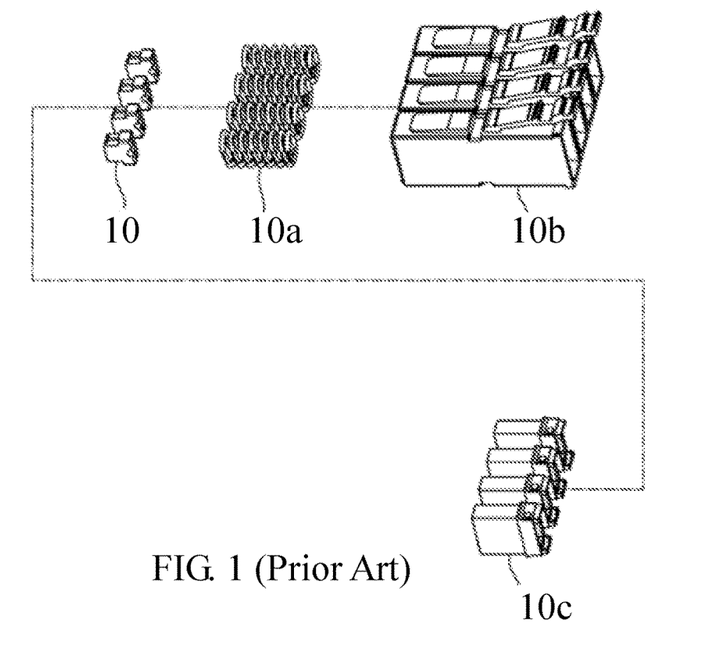
FIGS. 1 and 2 are schematic diagrams of conventional optical connectors.
Figure 2:
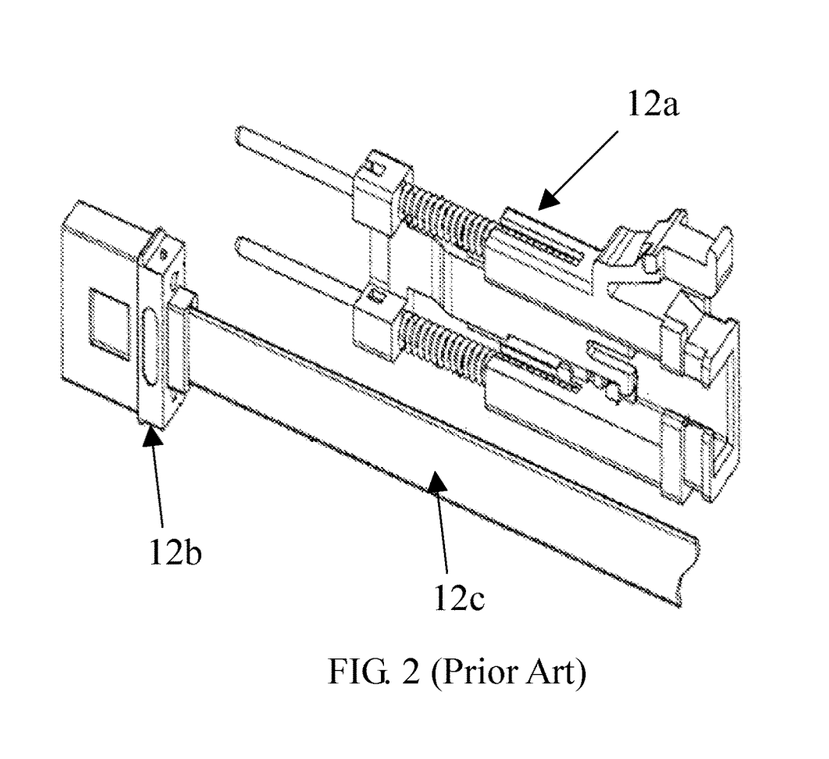

Although the conventional technology has an optical connector that generates optical signals and power at the same time, as shown in FIG. 1, which is a schematic diagram of a conventional optical connector. When assembling conventional optical connectors, the elements 10~10c must be loaded in order, and cannot be pre-assembled. They are all individual parts and are installed when needed, so that the installation speed would be very slow. Although the connector assembling method has been improved later, the conventional optical connector, such as shown in FIG. 2, could be assembled into the assembly module 12a in the factory. The user can finally install the terminal part 12b and the communication wire 12c, such as optical fiber, so that the installation speed would be faster. Nevertheless, the conventional optical fiber terminal part 12b cannot float, but could only move forward and backward along the spring axis. This can greatly increase errors in optical alignment, resulting in significant optical losses.

In summary, it's necessary for an optical connector to solve the aforesaid problems on market.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector with a terminal portion that is able to move in multiple degrees of freedom, thereby reducing optical alignment errors and reducing optical signal loss. In addition, the terminal portion and communication wires of the optical connector in the present invention can be pre-assembled to form a modular structure, and then assembled with the structural body of the optical connector, so as to save assembly time.

The present invention provides an optical connector, comprising: a structural body, having a first top surface, a first bottom surface, a first lateral surface, and a second lateral surface, wherein the first lateral surface and the second lateral surface are connected to the first top surface and the first bottom surface, the first lateral surface has a first opening slot, and the second lateral surface has a first buckle structure; and a terminal portion, coupled to a communication wire, having a second top surface, a second bottom surface, a third lateral surface, and a fourth lateral surface, wherein the third lateral surface and the fourth lateral surface are connected to the second top surface and the second bottom surface, the fourth lateral surface has a second buckle structure, the terminal portion is movably connected to the structural body, wherein when the terminal portion is connected to the structural body, the first lateral surface and the third lateral surface are located on the same side, and the second lateral surface and the fourth lateral surface are located on the same side, so that the second buckle structure is buckled with the first buckle structure, and the communication wire enters the structural body through the first opening slot.

In one embodiment of the present invention, the terminal portion has a pair of extending columns located on two sides of the second buckle structure. The terminal portion further comprises a terminal and a terminal base; wherein the terminal has a signal coupling end and a fixing end, the signal coupling end has a plurality of holes to allow each communication line of the communication wire to pass through, and the fixing end has a first fixing structure. The terminal base has a first connecting side and a second connecting side, the first connecting side has a second fixing structure combined with the first fixing structure, the second connecting side has the pair of extending columns, and the terminal base has a second opening slot connected to the first opening slot.

In one embodiment of the present invention, the structural body further comprises a pair of guiding grooves, a pair of guiding columns, and a pair of elastic structures. The pair of guiding grooves are disposed on two sides of the first opening slot. The pair of guiding columns are respectively disposed in the pair of guiding grooves. The pair of elastic structures are respectively sleeved on the pair of guiding columns, an end portion of the elastic structure is leaned against an inner wall of the guiding groove, and another end portion of the elastic structure is leaned against the terminal portion, so that the terminal portion moves with freedom relative to the structural body when being connected to the structural body.

In one embodiment of the present invention, a cantilever is disposed on the first top surface of the structural body, and the cantilever has a positioning structure. The first buckle structure of the second lateral surface is a buckling groove, and the second buckle structure of the fourth lateral surface is a convex portion; when the terminal portion is combined with the structural body, the convex portion is embedded into the buckling groove. A first end of the first buckle structure of the second lateral surface is a groove with an opening, a second end of the first buckle structure is connected to an expanding groove, which has a maximum width that is larger than width of the first buckle structure, the second buckle structure of the fourth lateral surface is a buckling protrusion, a free end of the buckling protrusion has a buckling element, and the second buckle structure is embedded into the first buckle structure, so that the buckling element is accommodated in the expanding slot.

In one embodiment of the present invention, the expanding slot has a first arc surface, the buckling element has a second arc surface movably connected to a first arc surface, so that the structural body and the terminal portion have freedom of movement. The convex portion has a freedom for one-dimensional linear movement within the buckling groove.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector and to aid it of skilled in the art in practicing this invention. These embodiments are merely exemplary embodiments and in no way to be considered to limit the scope of the invention in any manner.

Figure 3A:
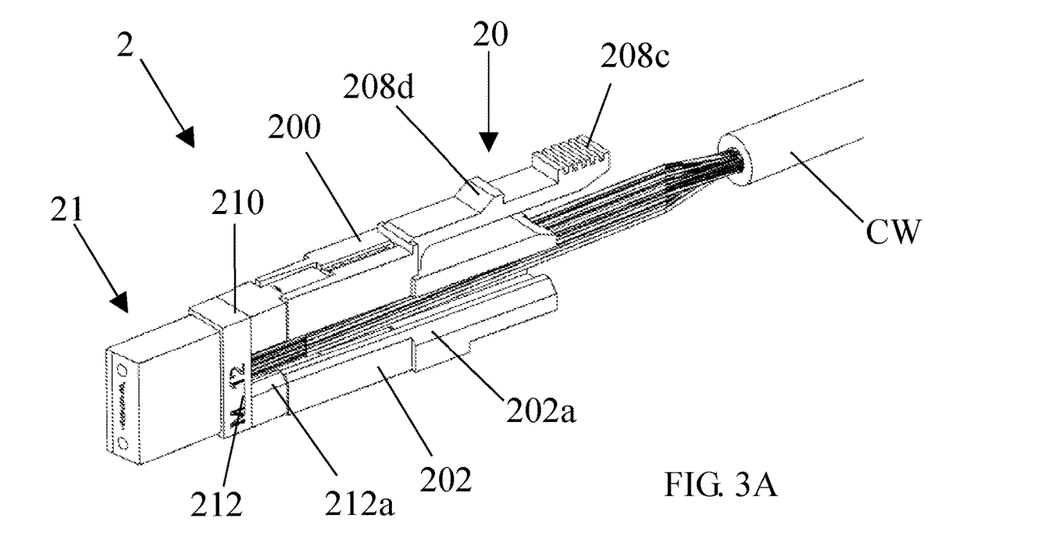
FIGS. 3A and 3B are schematic diagrams of an embodiment of the optical connector from different viewing angles in the present invention.
Figure 3B:
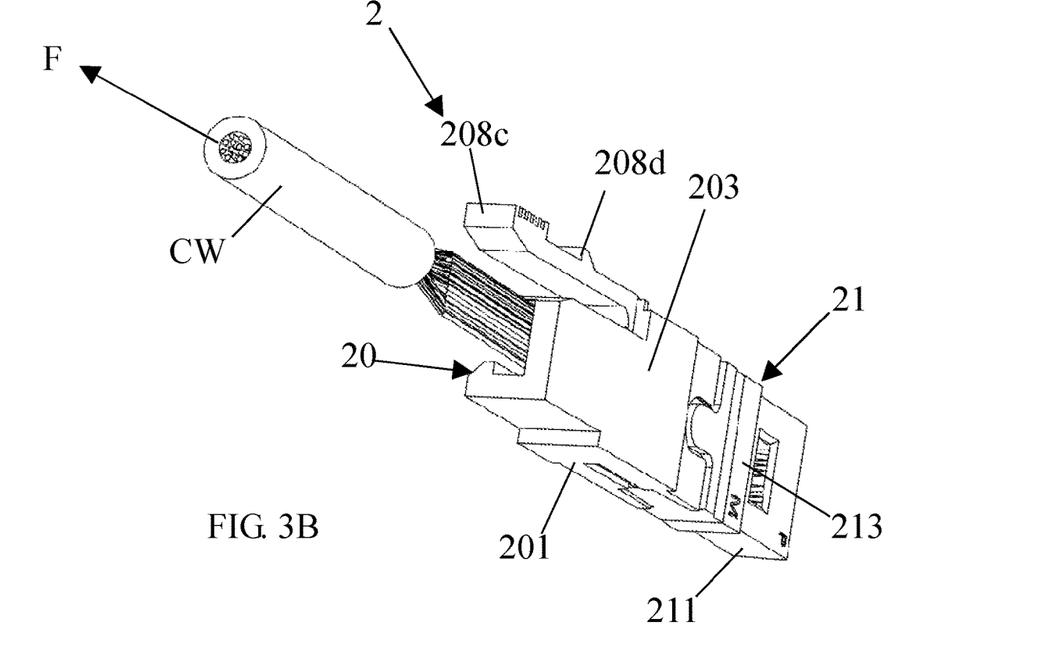
Figure 3C:
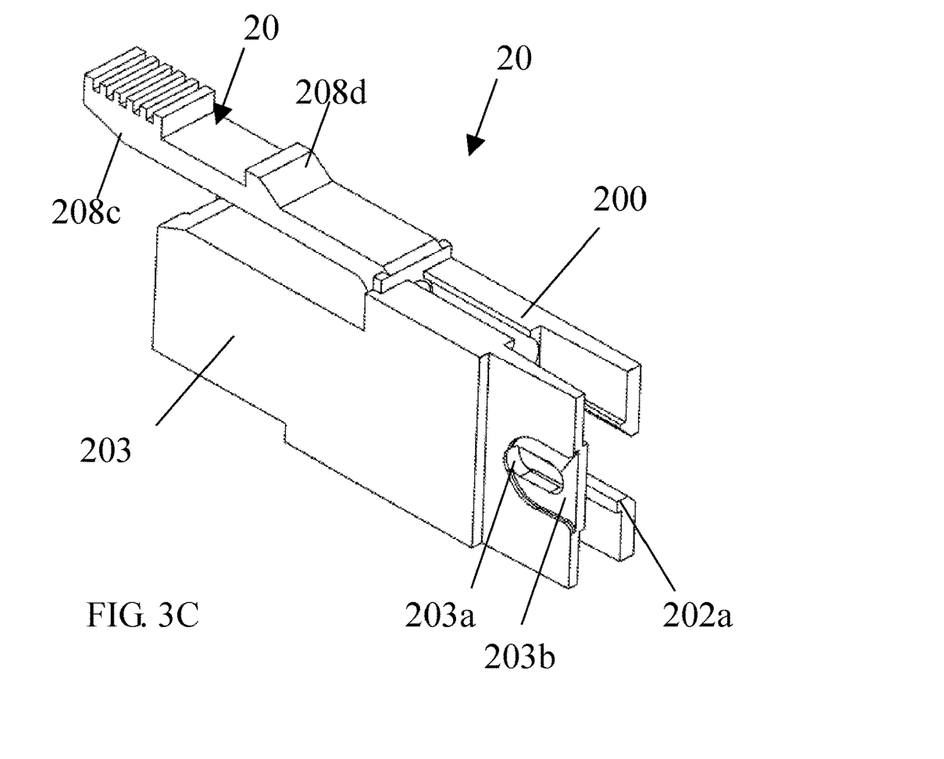
FIG. 3C is a schematic diagram of an embodiment of the structural body in the present invention.
Figure 3D:
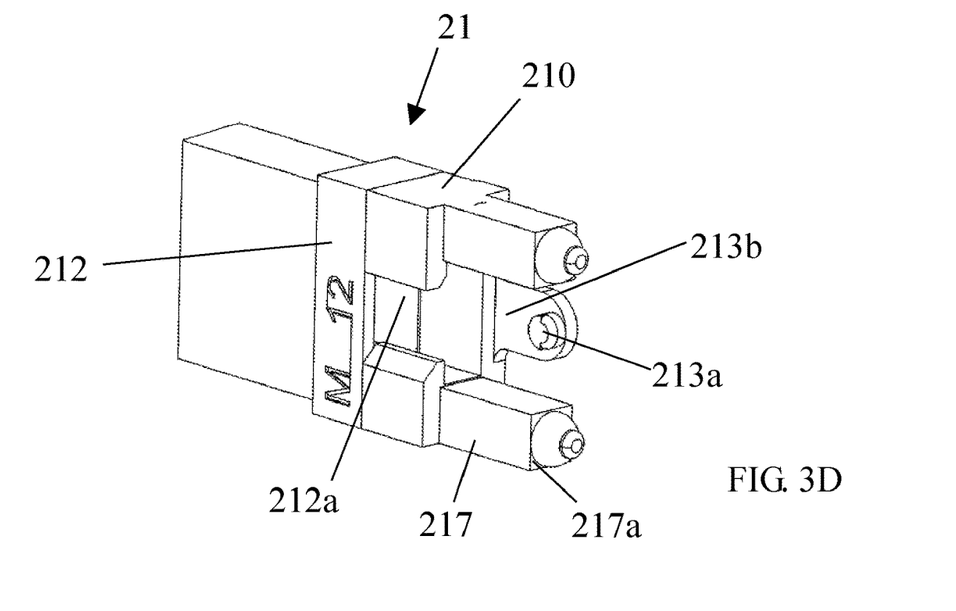
FIG. 3D is a schematic diagram of an embodiment of the terminal portion in the present invention.

Please refer to FIGS. 3A to 3D, FIGS. 3A and 3B are schematic diagrams of an embodiment of the optical connector from different viewing angles, FIG. 3C is a schematic diagram of an embodiment of the structure body, and FIG. 3D is a schematic diagram of an embodiment of the terminal portion in the present invention. The optical connector 2 is inserted into an optical receptacle (not shown in the figure). The optical connector in this embodiment is an MPO optical connector, but it is not limited to thereto. The optical connector 2 includes a structural body 20 and a terminal portion 21. The structural body 20 includes a first top surface 200, a first bottom surface 201, a first lateral surface 202 and a second lateral surface 203 which are connected to the first top surface 200 and the first bottom surface 201, wherein the first lateral surface 202 has a first opening slot 202a, the second lateral surface 203 has a first buckle structure 203a. In this embodiment, the first opening slot 202a passes through both ends of the first lateral surface 202. The first buckle structure 203a is disposed at the front end of the second lateral surface 203. In this embodiment, the first buckle structure 203a is a long groove formed in a recess structure 203b at the front end of the second lateral surface 203.

The terminal portion 21 is coupled with a communication wire CW and connected with the structural body 20. In this embodiment, the terminal portion 21 includes a second top surface 210, a second bottom surface 211, a third lateral surface 212 and a fourth lateral surface 213. Wherein, the fourth lateral surface 213 has a second buckle structure 213a, which is used to movably combine with the first buckle structure, so that the structural body 20 would not be separated from the terminal portion 21 when being pulled by a pulling force F (as shown in FIG. 3B) in the central axis direction of the optical connector 2. When the terminal portion 21 is connected to the structural body 20, the first lateral surface 202 and the third lateral surface 212 are located on the same side, and the second lateral surface 203 and the fourth lateral surface 213 are also located on the same side, so that the second buckle structure 213a is buckled with the first buckle structure 203a, and the communication wire CW enters the structural body 20 through the first opening slot 202a.

In this embodiment, the second buckle structure 213a of the terminal portion 21 is a convex portion. When the terminal portion 21 is combined with the structural body 20, the second buckle structure 213a is embedded into the first buckle structure 203a. Since the first buckle structure 203a is a buckling groove, the second buckle structure 213a is able to slide in the groove of the first buckle structure 203a, so that a floating connection is formed between the terminal portion 21 and the structural body 20, and they are relatively movable. The convex portion has a freedom for one-dimensional linear movement in the buckling groove, which increases the freedom for the terminal portion 21 to be coupled and aligned with the terminal in the optical receptacle when the terminal portion 21 is inserted into the optical receptacle. In addition, in this embodiment, the second buckle structure 213a is arranged on a convex plate 213b of the fourth lateral surface 213. When the terminal portion 21 is combined with the structural body 20, the convex plate 213b corresponds to a concave structure 203b, so that the first buckle structure 203a is embedded into the second buckle structure 213a. It should be noted that, in another embodiment, if the second buckle structure 213a is a buckling groove, and the first buckle structure is a convex portion, which can also be implemented.

Figure 4A:
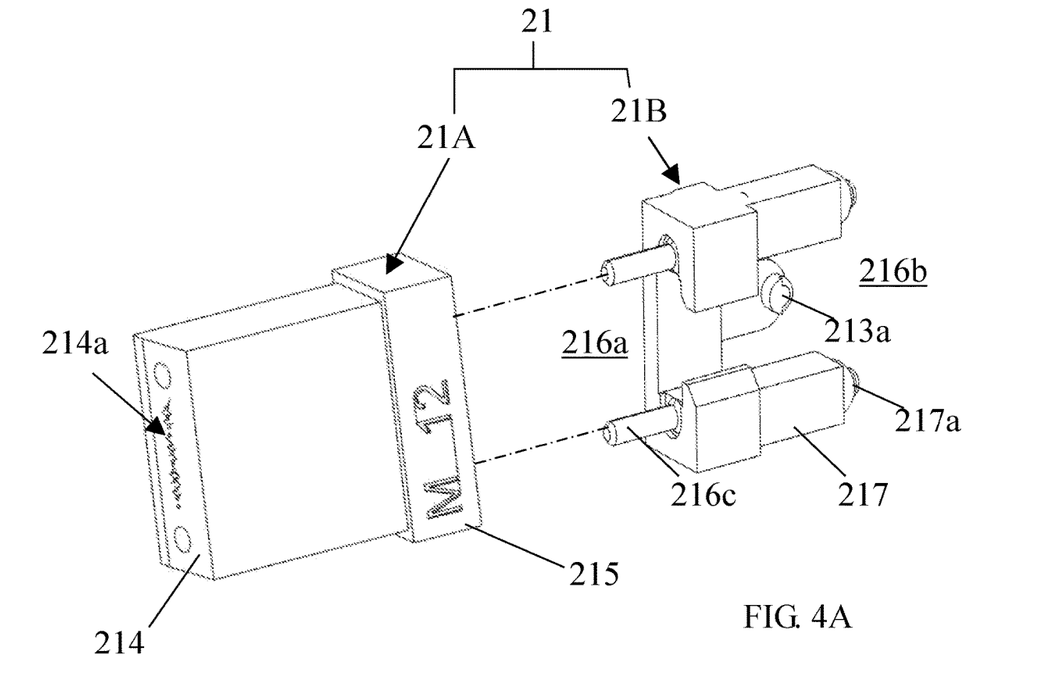
FIG. 4A is a three-dimensional exploded schematic diagram of an embodiment of the terminal portion in the present invention.
Figure 4B:
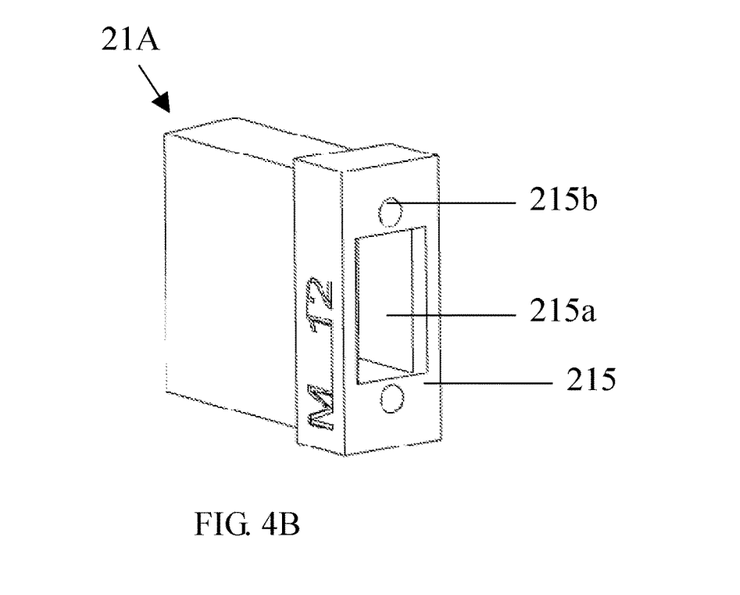
FIG. 4B is a schematic diagram of an embodiment of the terminal with different viewing angles in the present invention.

In this embodiment, as shown in FIGS. 4A and 4B, FIG. 4A is a three-dimensional exploded schematic diagram of an embodiment of the terminal portion, and FIG. 4B is a schematic diagram of an embodiment of the terminal with different viewing angles. The terminal portion 21 further includes a terminal 21A and a terminal base 21B. Wherein, the terminal 21A has a signal coupling end 214 and a fixing end 215. The signal coupling end 214 has a plurality of holes 214a to allow each communication line of the communication wire CW to pass through. The fixing end 215 has a wiring through hole 215a and a first fixing structure 215b located on both sides of the wiring through hole 215a. Wherein, the wiring through hole 215a allows communication wires CW to pass through. A plurality of communication lines included in the communication wire CW are inserted into the plurality of holes 214a of the signal coupling end 214 through the wiring through hole 215a.

The terminal base 21B has a first connecting side 216a and a second connecting side 216b. The first connecting side 216a has a second fixing structure 216c which is combined with the first fixing structure 215b included in the fixing end 215 of the terminal 21A. In this embodiment, the second fixing structure 216c is a positioning pin with rod-shaped structure, and the first fixing structure 215b is a piercing hole, so that when the terminal 21A is combined with the terminal base 21B, the second fixing structure 216c can be embedded into the first fixing structure 215b. In another embodiment, the second fixing structure 216c can also be a piercing hole, and the first fixing structure 215b can be a positioning pin with a rod-shaped structure, which can also be implemented in the present invention. In addition, the second connecting side 216b of the terminal base 21B has a pair of extending cylinders 217, and the free end of each extending cylinder 217 corresponding to the structural body 20 has a leaning portion 217a, the use of which would be described later. The terminal base 21B further has a second opening slot 212a located on the third lateral surface 212. When the terminal portion 21 is combined with the structural body 20, the second opening slot 212a is connected with the first opening slot 202a.

Figure 4C:
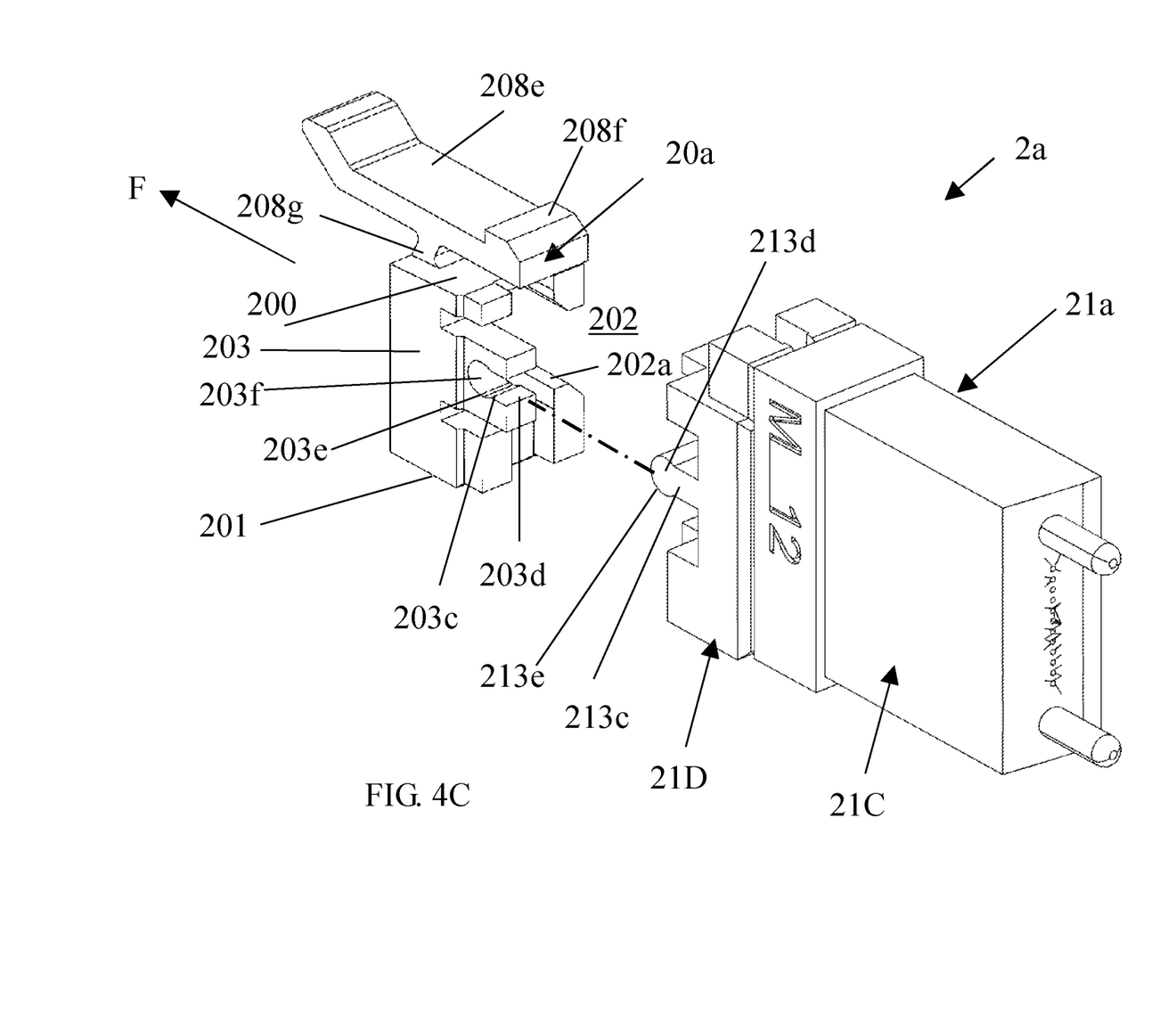
FIG. 4C is a three-dimensional schematic diagram of another embodiment of the optical connector in the present invention.

Please refer to FIG. 4C, which is a three-dimensional schematic diagram of another embodiment of the optical connector in the present invention. The optical connector 2a in this embodiment includes a structural body 20a and a terminal portion 21a. The structural body 21a includes a first top surface 200, a first bottom surface 201, a first lateral surface 202 and a second lateral surface 203, which are connected to the first top surface 200 and the first bottom surface 201. A cantilever 208e is disposed on the first top surface 200, and the cantilever 208e is connected to the first top surface 20 through an extending rod 208g. The cantilever 208e has a positioning structure 208f. In this embodiment, the positioning structure 208f is a protruding structure, which is used to engage with the groove on the optical receptacle, so that the optical connector 2a can be stably and firmly inserted into the optical receptacle. The first lateral surface 202 has a first opening slot 202a. In this embodiment, the first opening slot 202a passes through both ends of the first lateral surface 202. The second lateral surface 203 has a first buckle structure 203c. The first buckle structure 203c is disposed at the front end of the second lateral surface 203. In this embodiment, the first buckle structure 203c is a groove with an opening 203d at the first end. The second end of the first buckle structure 203c is connected to an expanding groove 203e, which has a maximum width that is larger than the width of the first buckle structure 203c. In this embodiment, the expanding groove 203e is a curvature structure and has a first curving surface 203f. In this embodiment, the main body of the first buckle structure 203c is a rectangular groove, and the expanding groove 203e is a circular groove connected to the first buckle structure 203c.

The terminal portion 21 includes a terminal 21C and a terminal base 21D. The structure of the terminal 21C is similar to that of the aforementioned terminal 21A, and would not be described again. The terminal base 21D is connected to the terminal 21C on one side, and has a second buckle structure 213c on the other side, corresponding to the first buckle structure 203c. The second buckle structure 213c is movably combined with the first buckle structure 203c, so that the terminal portion 21a and the structural body 20a are connected in a relatively movable manner, and the structural body 20a would not be separated from the terminal portion 21a when it is pulled by the pulling force F in the central axis direction of the optical connector 2a. The second buckle structure 213c is a buckling protrusion with a buckling element 213d at its free end. The second buckle structure 213c is embedded into the first buckle structure 203c, so that the buckling element 213d can be relatively movable and accommodated in an expanding slot 203e of the first buckle structure 203c. In this embodiment, the main body of the second buckle structure 213c is a rectangular rod, and an end of the buckling element 213d is a circular structure. The buckling element 213d has a second arc surface 213e movably connected to a first arc surface 203f, so that the structural body 20a and the terminal portion 21a have freedom of movement after the first buckle structure 203c is connected to the second buckle structure 213c. It should be noted that the structure of the expanding slot 203f and the buckling element 213d is not limited to a circle, as long as the terminal portion 21a and the structural body 20a can be connected in a relatively movable manner, and the structural body 20a would not be detached when being pulled by the pulling force F in the central axis of the optical connector 2a.

Figure 5:
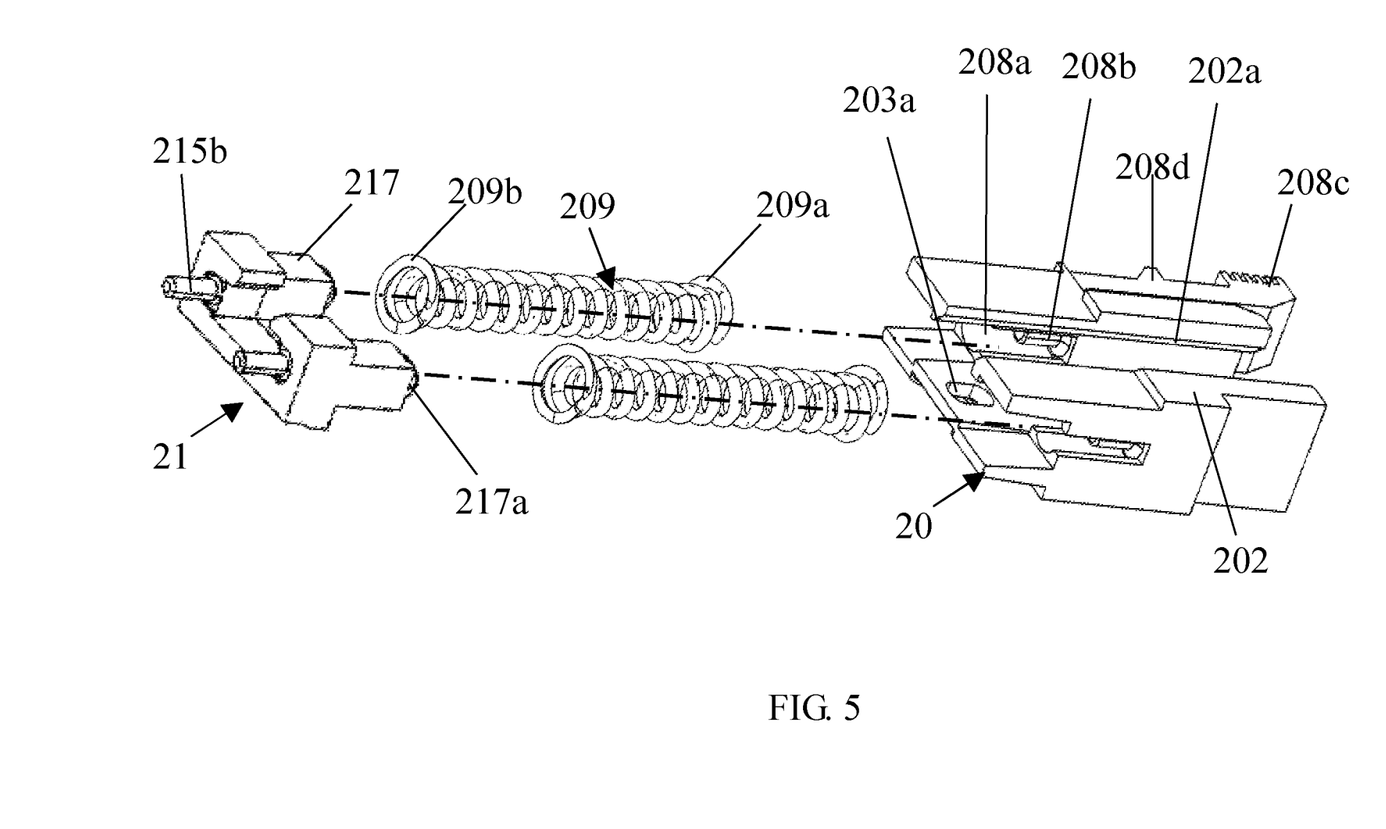
FIG. 5 is a schematic diagram of disassembly and assembly of the terminal portion and the structural body in the present invention.

Please refer to FIG. 5, which is a schematic diagram of disassembly and assembly of the terminal portion and the structural body. In this embodiment, the structural body 20 includes a pair of guiding grooves 208a, a pair of guiding columns 208b, a cantilever 208c, and a pair of elastic structures 209. The pair of guiding grooves 208a are disposed on two sides of the first opening slot 202a. The pair of guiding columns 208b are respectively disposed in the pair of guiding grooves 208a. The pair of elastic structures 209 are respectively sleeved on the pair of guiding columns 208b, an end portion 209a of the elastic structures 209 is leaned against the inner wall of the corresponding guiding groove 208a, and another end portion 209b of the elastic structures 209 is leaned against the terminal portion 21, so that the terminal portion 21 is able to move with freedom relative to the structural body 20 under the state of being connected to the structural body 20. The cantilever 208c has a positioning structure 208d. In this embodiment, the positioning structure 208d is a convex structure, which is used to engage with the groove on the optical receptacle, so that the optical connector 2 can be stably and firmly inserted into the optical receptacle.

Figure 6A:
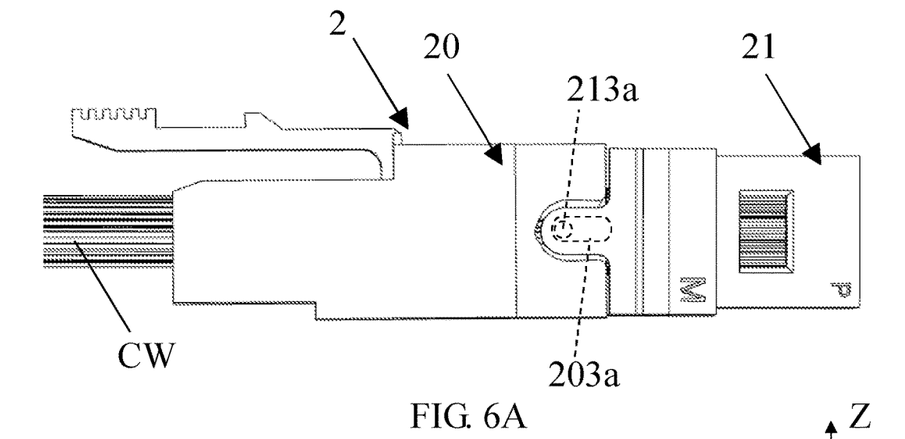
FIGS. 6A to 6C are schematic diagrams of operating the optical connector in the present invention.
Figure 6B:
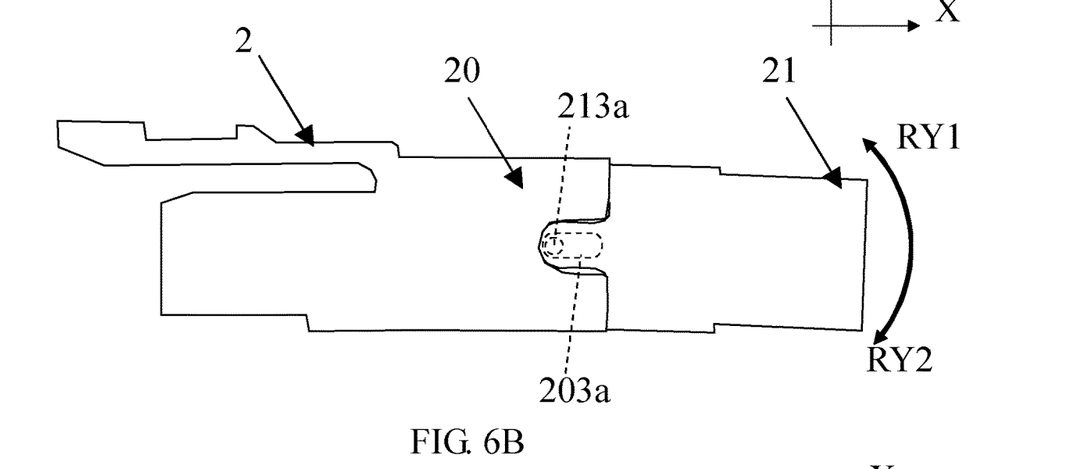
Figure 6C:
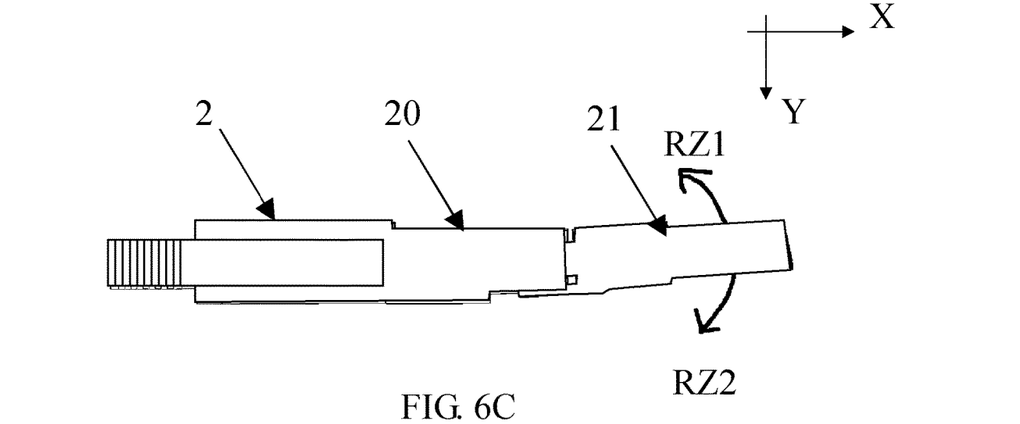

Please refer to FIGS. 5 and 6A to 6C, FIGS. 6A to 6C are schematic diagrams of operating the optical connector in the present invention. The terminal portion 21 and the structural body 20 are connected through the floating connection between the first buckle structure 203a and the second buckle structure 213a, and the end portion 209b of the elastic structure 209 is leaned against a leaning portion 217a of the extending column 217 of the terminal portion 21 to allow that the leaning portion 217a is movably connected to the elastic structure 209, so that the terminal portion 21 has multi-axial freedom of movement. For example, please refer to FIG. 6A, it represents a state when the terminal portion 21 is in the normal position. FIG. 6B is a schematic side view diagram of the optical connector. In this embodiment, the terminal portion 21 is rotated in the direction of RY1 and RY2 in the Y axis, and the terminal portion 21 would not fall off during the rotation process due to the connection between the first buckle structure 203a and the second buckle structure 213a. As shown in FIG. 6C, it is a schematic top view diagram of the optical connector. In this embodiment, the terminal portion 21 is rotated in the direction of RZ1 and RZ2 in the Z axis, and the terminal portion 21 would not fall off during the rotation process due to the connection between the first buckle structure 203a and the second buckle structure 213a. Through the rotational movement of the terminal portion 21 of RY1~2 and RZ1~2, the accuracy of alignment can be improved and the optical signal loss can be reduced. It should be noted that, although the rotational freedom described in FIGS. 6B to 6C is explained by the embodiment of the optical connector 2 of FIGS. 3A and 3B, for the optical connector 2a of FIG. 4C, the operation of the first buckle structure 203c and the second buckle structure 213c is also as shown above and would not be described again.

To sum up, the optical connector of the present invention has a terminal portion that is able to move with multiple degrees of freedom, thereby reducing optical alignment errors and reducing optical signal loss. In addition, the terminal portion and communication wires of the optical connector of the present invention can be pre-assembled to form a modular structure, and then assembled with the structural body of the optical connector to save assembly time.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:
    a structural body, having a first top surface, a first bottom surface, a first lateral surface, and a second lateral surface, wherein the first lateral surface and the second lateral surface are connected to the first top surface and the first bottom surface, the first lateral surface has a first opening slot, and the second lateral surface has a first buckle structure; and
    a terminal portion, coupled to a communication wire, having a second top surface, a second bottom surface, a third lateral surface, and a fourth lateral surface, wherein the third lateral surface and the fourth lateral surface are connected to the second top surface and the second bottom surface, the fourth lateral surface has a second buckle structure, the terminal portion is movably connected to the structural body,
    wherein when the terminal portion is connected to the structural body, the first lateral surface and the third lateral surface are located on the same side, and the second lateral surface and the fourth lateral surface are located on the same side, so that the second buckle structure is buckled with the first buckle structure, and the communication wire enters the structural body through the first opening slot.

2. The optical connector of claim 1, wherein the terminal portion has a pair of extending columns located on two sides of the second buckle structure.

3. The optical connector of claim 2, wherein the terminal portion comprises:
    a terminal; having a signal coupling end and a fixing end, wherein the signal coupling end has a plurality of holes to allow each communication line of the communication wire to pass through, and the fixing end has a first fixing structure; and
    a terminal base, having a first connecting side and a second connecting side, wherein the first connecting side has a second fixing structure combined with the first fixing structure, the second connecting side has the pair of extending columns, and the terminal base has a second opening slot connected to the first opening slot.

4. The optical connector of claim 1, wherein the structural body comprises:
    a pair of guiding grooves, disposed on two sides of the first opening slot;
    a pair of guiding columns, respectively disposed in the pair of guiding grooves; and
    a pair of elastic structures, respectively sleeved on the pair of guiding columns, wherein an end portion of the elastic structure is leaned against an inner wall of the guiding groove, and another end portion of the elastic structure is leaned against the terminal portion, so that the terminal portion moves with freedom relative to the structural body when being connected to the structural body.

5. The optical connector of claim 1, wherein the first buckle structure of the second lateral surface is a buckling groove, and the second buckle structure of the fourth lateral surface is a convex portion; when the terminal portion is combined with the structural body, the convex portion is embedded into the buckling groove.

6. The optical connector of claim 5, wherein the convex portion has a freedom for one-dimensional linear movement within the buckling groove.

7. The optical connector of claim 1, wherein a first end of the first buckle structure of the second lateral surface is a groove with an opening, a second end of the first buckle structure is connected to an expanding groove, which has a maximum width that is larger than width of the first buckle structure, the second buckle structure of the fourth lateral surface is a buckling protrusion, a free end of the buckling protrusion has a buckling element, and the second buckle structure is embedded into the first buckle structure, so that the buckling element is accommodated in the expanding slot.

8. The optical connector of claim 7, wherein the expanding slot has a first arc surface, the buckling element has a second arc surface movably connected to a first arc surface, so that the structural body and the terminal portion have freedom of movement.

9. The optical connector of claim 1, wherein a cantilever is disposed on the first top surface of the structural body, and the cantilever has a positioning structure.

\* \* \* \* \*